United States Patent [19]

Miruri

[11] Patent Number: 4,995,680
[45] Date of Patent: Feb. 26, 1991

[54] SAFETY DEVICE FOR CONCEALING APPARATUS

[76] Inventor: Alberto G. Miruri, Francisco Silvela, 76, 28028 Madrid, Spain

[21] Appl. No.: 346,526

[22] Filed: May 2, 1989

[30] Foreign Application Priority Data

| | | |
|---|---|---|
| May 4, 1988 [ES] | Spain | 8801381 |
| May 26, 1988 [ES] | Spain | 8801699 |
| Jun. 7, 1988 [ES] | Spain | 8801844 |

[51] Int. Cl.⁵ .......................................... A47B 81/06
[52] U.S. Cl. ..................................... 312/7.1; 312/266; 248/27.1
[58] Field of Search ................ 312/7.1, 204, 266, 267, 312/269, 319; 248/27.1, 201

[56] References Cited

U.S. PATENT DOCUMENTS

| | | | |
|---|---|---|---|
| 1,828,208 | 10/1931 | Taylor | 312/267 |
| 3,224,827 | 12/1965 | Foster et al. | 312/266 |
| 3,406,999 | 10/1968 | Kozicki | 312/266 X |
| 4,076,351 | 2/1978 | Wyant | 312/319 X |
| 4,494,806 | 1/1985 | Williams et al. | 312/330.1 X |

*Primary Examiner*—Joseph Falk
*Attorney, Agent, or Firm*—Staas & Halsey

[57] ABSTRACT

To prevent theft of car radios and the like, there is provided a structure insertable in a vehicle panel, preferably, in the front panel, forming a case-receptacle (2) of the apparatus (5) and in which are provided a first case portion (3) open outwards for containing the apparatus in its operative or functioning position, and a second case portion (4) concealed from the outside for containing the apparatus (5) in its safety position. The case-receptacle (2) includes guide slots (8) and stems (12) fixed to the apparatus (5) for moving the radio between the said portions (3 and 4), which is activated by connecting rods (13) driven by an electromotor (19). This device can also be coupled to household furniture and panels for concealing apparatus such as televisions, video reproducers-recorders, musical equipments, etc.

8 Claims, 5 Drawing Sheets

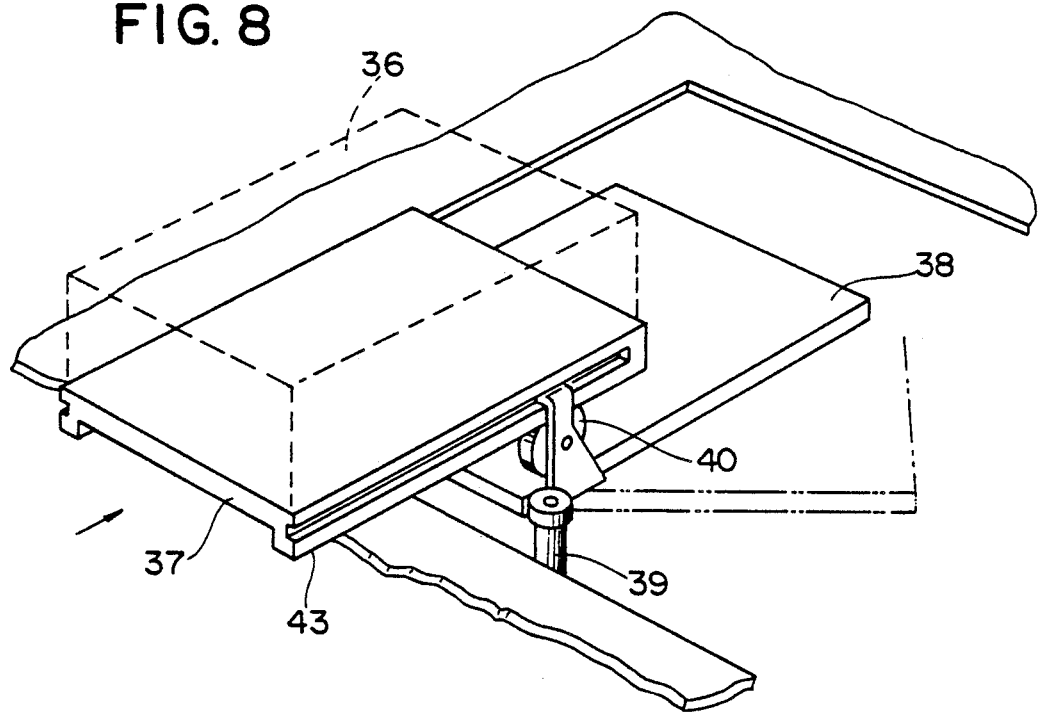
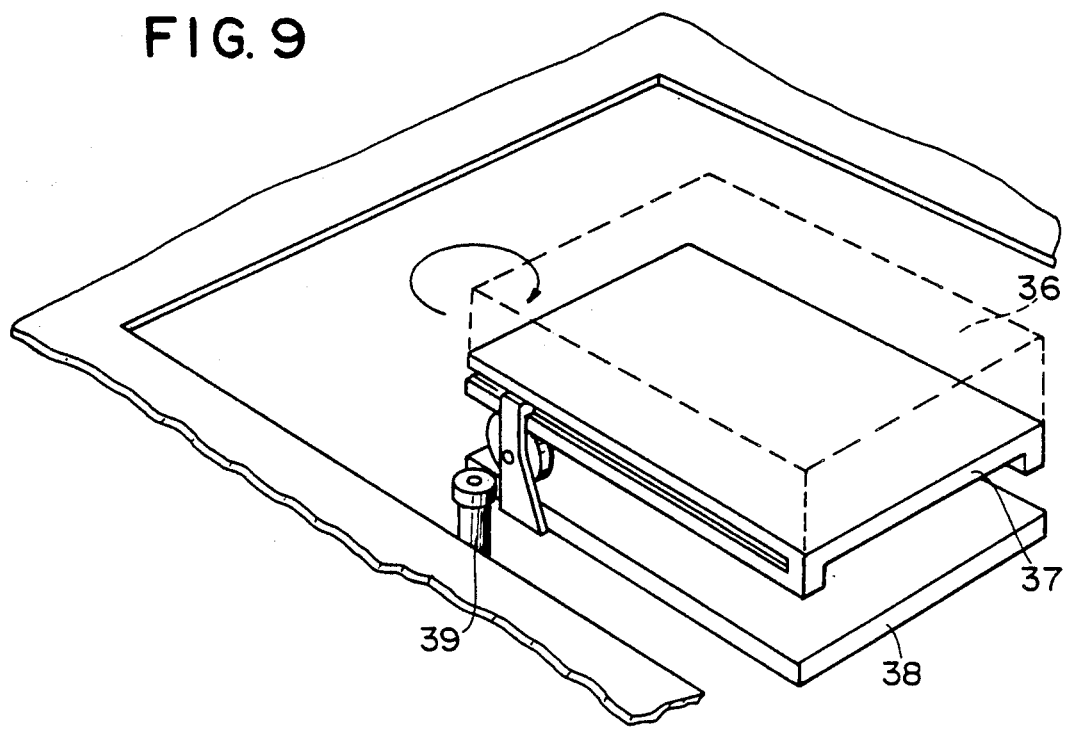

SAFETY DEVICE FOR CONCEALING APPARATUS

BACKGROUND OF THE INVENTION

The present invention relates to a safety device against apparatus spoliation, particularly car radios, which device may be coupled to an automobile panel, preferably its front panel, so that because it is concealed it does not constitute an attraction for possible thefts from the vehicle.

Unfortunately, radio apparatus are frequently stolen from vehicle. This problem is exacerbated by the fact that the apparatus is within the delinquent's sight. A common solution consists of installing removable car radios which the user carries around with him. Although it is true that this solution solves the above mentioned problem, it is no less true that the continuous carrying around of the car radio is extremely troublesome; Furthermore, it is undeniable that the said removable assemblies may cause a deterioration of the apparatus and the apparatus may even, in case of sudden brakings of the car, be ejected, consequently posing a risk of deterioration of the apparatus as well as possible physical injuries to the automobile passengers, particularly to those travelling in the back seats of the vehicle.

SUMMARY OF THE INVENTION

The object of the invention is to provide a device of the type initially mentioned which may preferably be coupled to the front panel of a vehicle in which there are free spaces for the coupling thereof This is achieved, in accordance with the invention, since the said device comprises:

A case-receptacle for the apparatus consisting of a structure insertable in one of the panels of the vehicle, preferably the front panel, having two adjacent intercommunicated portions, the first of which, having at least one outward opening, is intended for containing the apparatus in its operative position with its front face projecting from the said opening whereas the second portion, which is concealed from the outside, will house the apparatus in its safety or concealed position;

Guide means for moving the apparatus from the first portion to the second portion of the case-receptacle; and drive means, preferably electromechanical, for moving the apparatus from the first position to the second position.

This arrangement gives the impression that the radio apparatus has been removed from its housing, wherefore spoliation thereof is not possible and there is no need for the user to be burdened with the said apparatus when he is not in the vehicle.

The device, in a first operating sequence, is displaced from the first portion to the second portion of its case-receptacle in which it is concealed inside the vehicle panel. In accordance with the invention, the case-receptacle is advantageously provided with a dustproof flap or cover which closes the opening of the device.

In a preferred embodiment of the invention, the case-receptacle has a substantially L-shaped configuration, the depth of each leg of which is in the magnitude range of the depth of the apparatus. Nevertheless, it may be recommendable, in view of the structure of the vehicle panel, for the said case-receptacle to have a substantially parallelepiped shape having a depth approximately twice the depth of the apparatus.

The guide means may be provided as slots made in the side walls of the case-receptacle and guide stems secured to the casing of the apparatus.

The drive means is preferably an electromotor, the power output of which is coupled to a set of gears having output pinions incorporating connecting rods operatively connected to the stems of the apparatus. In an alternative embodiment, the drive means is comprised of a rack provides adjacently to one of the said guide slots which cooperates with an electromotor secured to the apparatus casing, so that when the said motor is started, the apparatus casing and consequently the apparatus itself is displaced along the said rack.

As will be fully understood, if the case-receptacle has the shape of an L, both the said guides as well as the said rack will also have the shape of an L. If, on the contrary, the case-receptacle has a parallelepiped shape, the guide and rack shall be substantially straight In an alternative embodiment, the apparatus is shifted from the first position to the second position by means of a pair of platforms, one sliding with respect to the other. One platform supports the apparatus firmly whereas the other is free to turn with respect to an axis coplanar or even perpendicular to the said second platform.

In this case, the drive means is at least one electromotor coupled to a traction wheel for the relative displacement of the said platforms and for the turn of the second platform about the said axis.

Although the present invention has been fundamentally devised for coupling to the vehicle panel, it may be used for concealing household appliances, such as video and audio apparatus, etc., in which case it will be placed in a cabinet or panel designed for such purpose.

BRIEF DESCRIPTION OF THE DRAWINGS

Other characteristics and advantages will be more fully understood from the following description taken in conjunction with the accompanying drawings showing nonlimiting embodiments, in which:

FIGS. 8 and 9 illustrate an embodiment similar to that shown in FIGS. 6 and 7, in which the turn towards its concealed position takes place according to an axis perpendicular to the device.

DETAILED DESCRIPTION OF THE PREFERRED EMBODIMENTS

Figure 1:
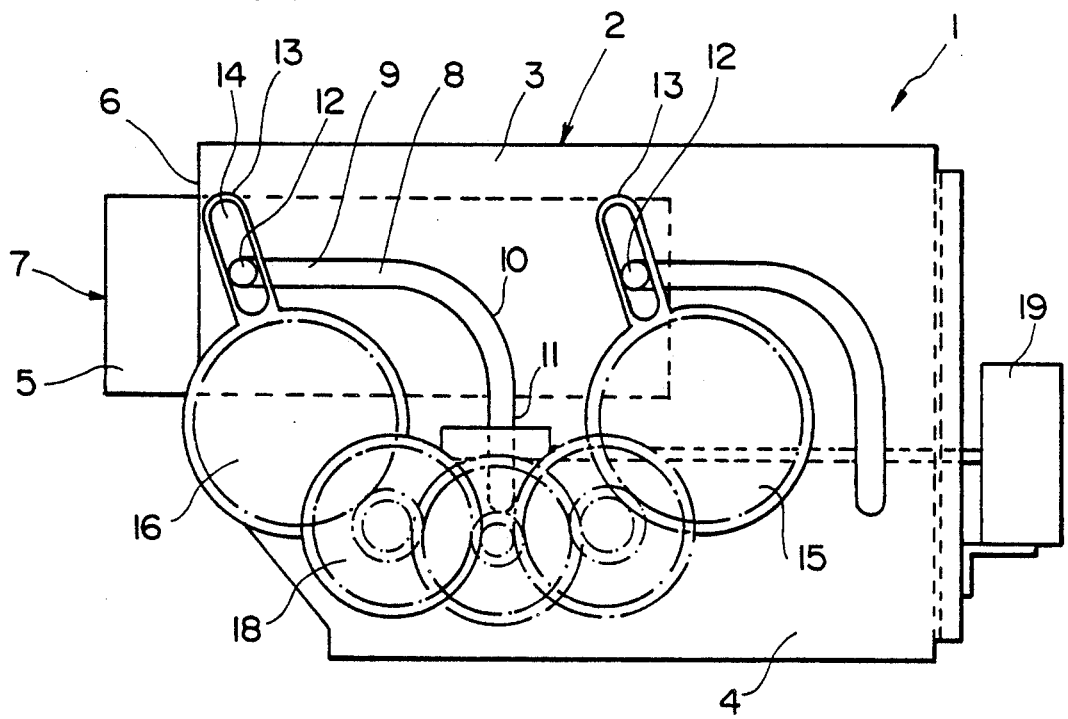
FIG. 1 illustrates an elevational view in partial section of a safety device according to the invention, in which the apparatus is in its operative or functioning position.
Figure 2:
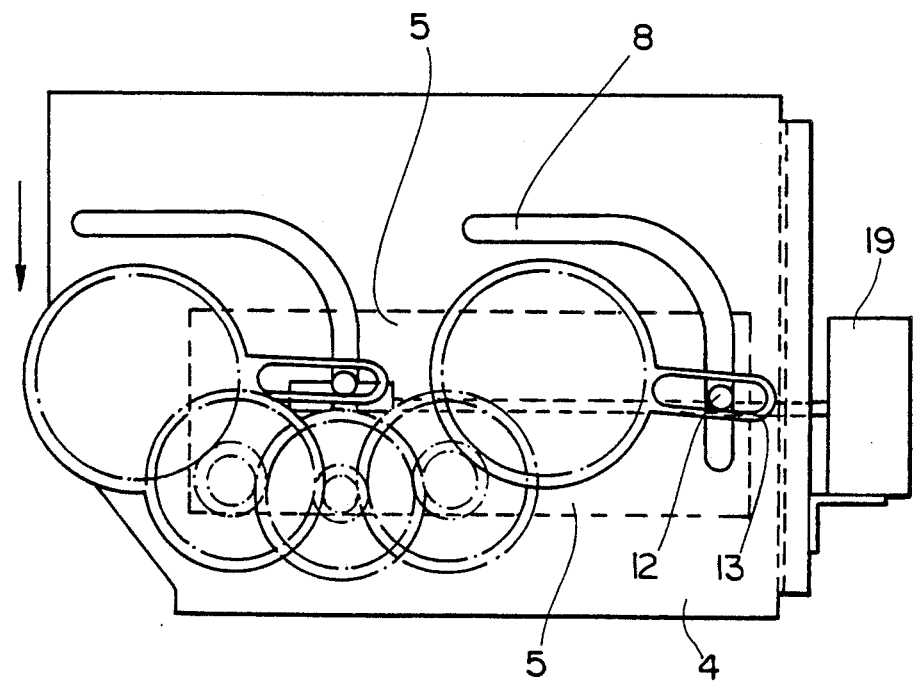
FIG. 2 illustrates a view of the device of FIG. 1, in which the apparatus is concealed in its safety position.

Referring to FIGS. 1 and 2, it can be seen that the device is comprised of a frame or structure 1 insertable in an automobile panel (not shown) forming a case-receptacle 2 having a first portion 3 and a second portion 4, adjacent and intercommunicated, which are designed for containing an apparatus 5.

The first portion 3, having at least one opening 6 through which the front face 7 of the apparatus 5 can be reached in order to activate its controls, will have an extension Sufficient for containing the apparatus 5. The second portion 4, in turn, has an extension which enables the apparatus 5 to be loosely housed and is designed for containing the apparatus 5 in its safety or concealed position. It may be recommendable for the opening 6 to be provided with a swivel cover (not shown) which is lifted with the advance of the front face 7 of the apparatus 5 and which is lowered when the said apparatus 5 re&urns to its concealed position in the second portion 4.

The side walls of the case-receptacle 2 are provided with guide slots 8, the extent of which is comprised of a straight first section 9, a curved section section 10 and a straight third end section 11, in which are coupled stems 12 secured to the apparatus 5.

Still referring to FIGS. 1 and 2, for driving the device there are provided connecting rods 13, in the slots 14 of which will be coupled the said stems 12. Each of the connecting rods 13 is securely mounted on gears 15 and 16 which are driven by a set of gears 18 operated by an electromotor 19. Starting of the safety device may be controlled by a suitable electric switch or any other known means, as will be evident to any expert, as well as by an element for achieving the reversal of the turn of the motor, so that the apparatus may be displaced from one position to the other in the two possible directions.

As will clearly be seen from FIGS. 1 and 2, the apparatus 5 may be displaced from the first position 3, so that it may be handled from the outside, to a second position 4, in which it remains concealed, and vice versa.

Figure 3:
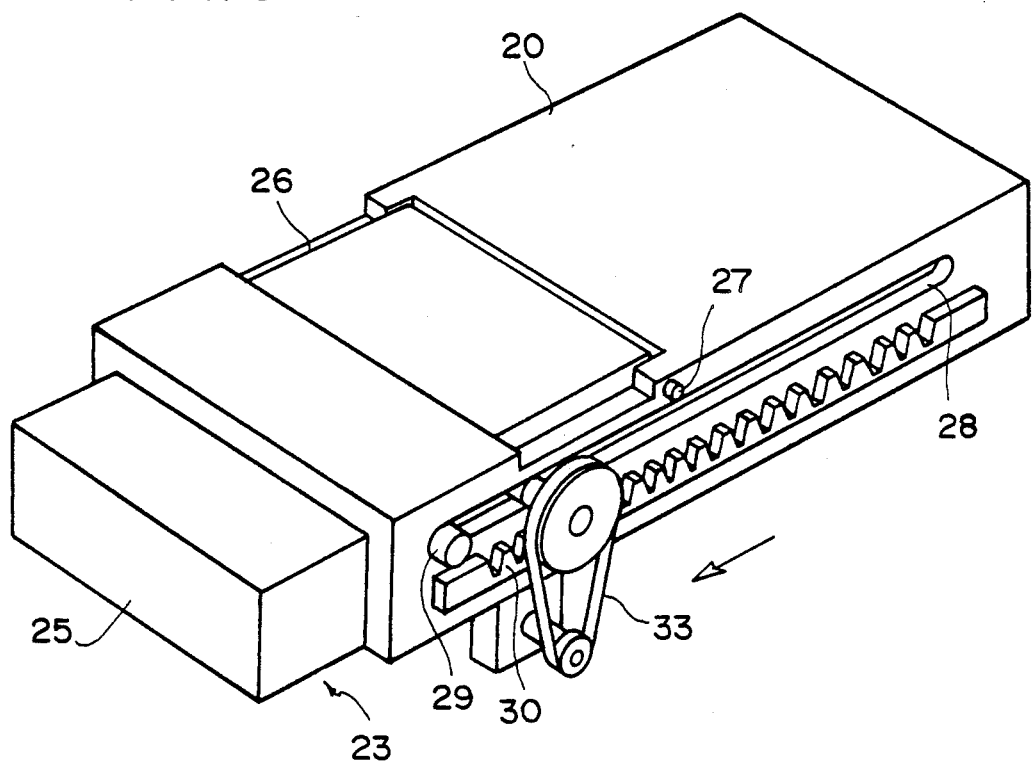
FIG. 3 illustrates a perspective view of an alternative embodiment of the safety device in which the apparatus is in its functioning position.
Figure 4:
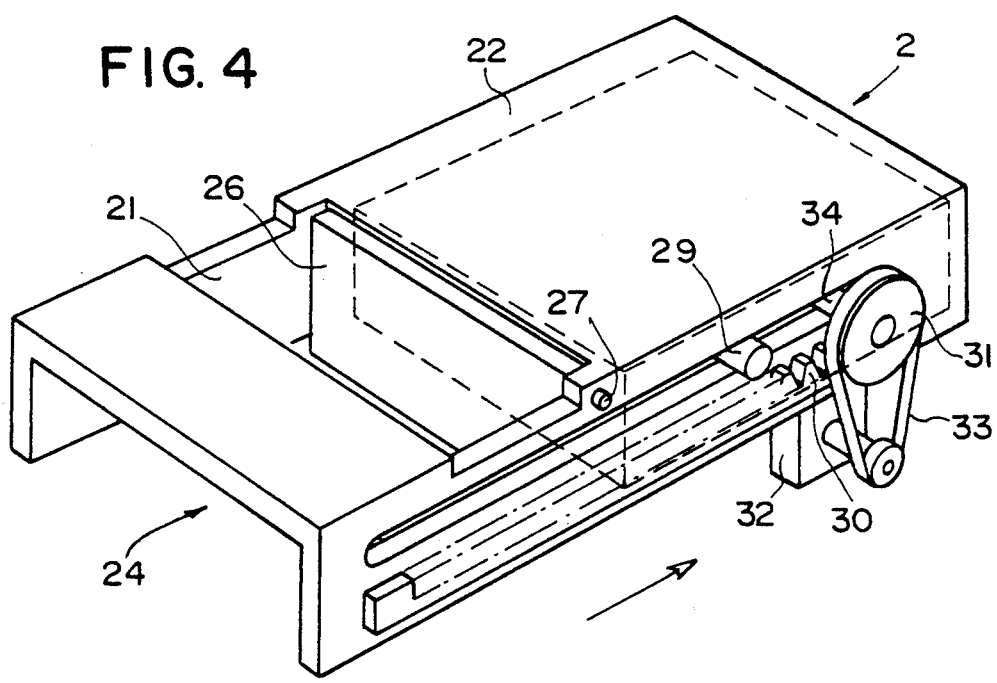
FIG. 4 illustrates the device of FIG. 3, in which the apparatus is concealed in its safety position.

FIGS. 3 and 4 refer to another embodiment of the invention in which the case-receptacle 20 is substantially parallelepiped in shape, in which are defined two adjacent intercommunicated portions 21 and 22 designed for containing an apparatus 23.

The said first portion 21 has at least one opening 24 through which the front part 25 of the apparatus 23 can be reached in order to activate the controls thereof. The second portion 22, in turn, is designed for containing the apparatus 23 in a concealed position. The two portions 21 and 22 are prolonged in at least a depth twice that of the apparatus 23 contained therein. It may be recommendable for the opening 24 to be provided with a dustproof door 26 swiveling on a pivot 27, so that it will be lifted with the advance of the apparatus 23 and it will be lowered, closing it, when the said apparatus 23 returns to its safety or concealed position.

At least one of the side walls of the case-receptacle 20 is provided with a guide slot 28 along which a stem 29, secured to the apparatus 23, slides; further adjacently to the said guide slot 28 there is provided a rack 30 which meshes with a pinion 31 operated by an electromotor 32 through a transmission belt 33. As can be seen, the pinion 31 is tightly joined to the apparatus 23 by means of a flange 34. In this manner when the electromotor turns, the apparatus 23 will be displaced from its first position 21 to its second position 22 at which it is concealed. Similarly, when the motor 32 turns inversely, the apparatus 23 will be displaced from the safety position 22 until it occupies the position 21, with its front part 25 protruding outwards. As will be evident to experts, the control of the device will take place by means of suitable conventional switching devices.

Figure 5:
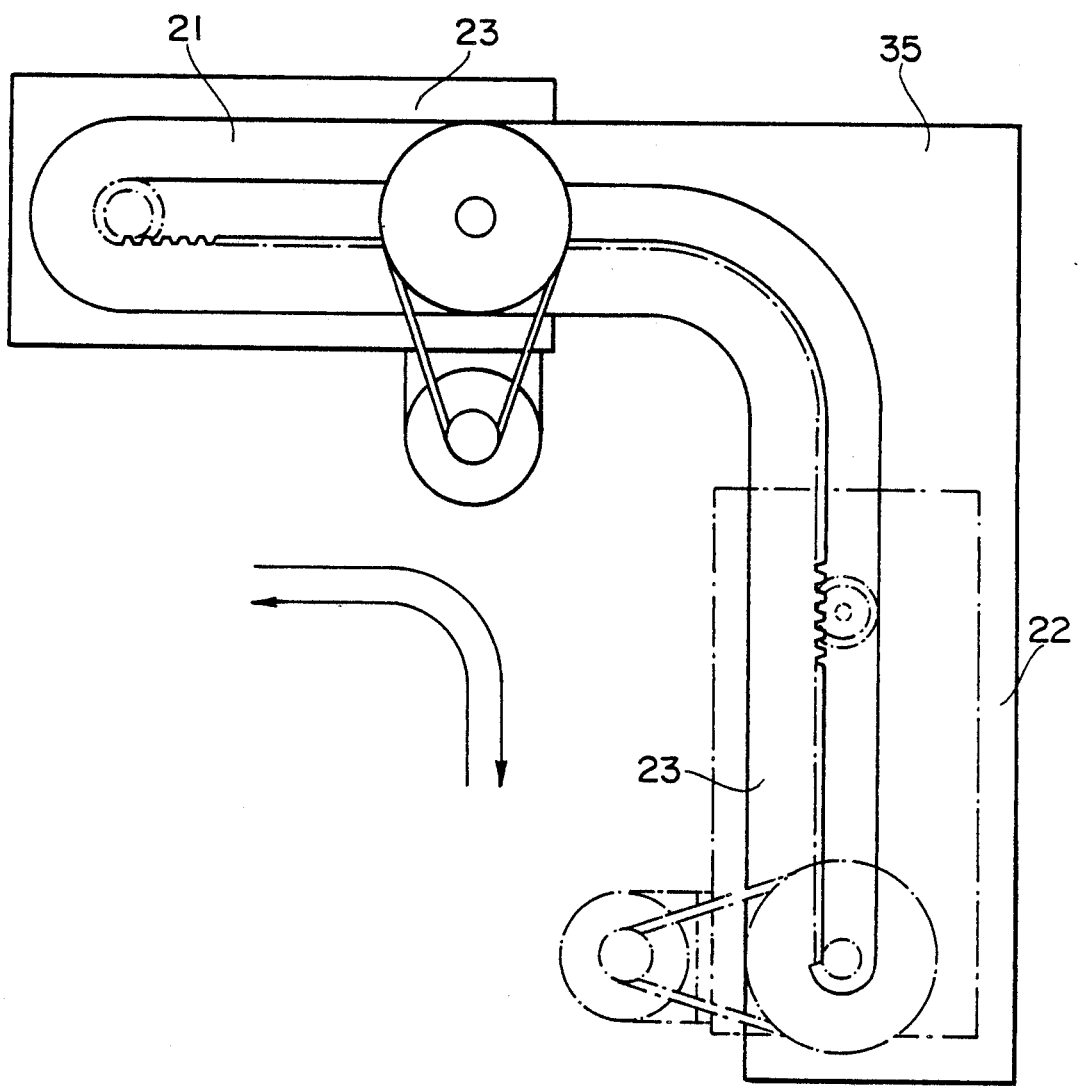
FIG. 5 illustrates another embodiment of the invention similar to that of FIGS. 3 and 4, in which the case-receptacle has a substantially L-shape.

As can be seen in FIG. 5, it may be recommendable for the case-receptacle 20 to have a substantially L-shaped configuration, in which case the guide slot 28 and the rack 30 will likewise have an L-shaped configuration.

As can readily be understood, it is also possible to shift an apparatus 23 between a first position, accessible from the outside, and a second safety position at which the said apparatus 23 is concealed, as well as in an inverse direction.

Figure 6:
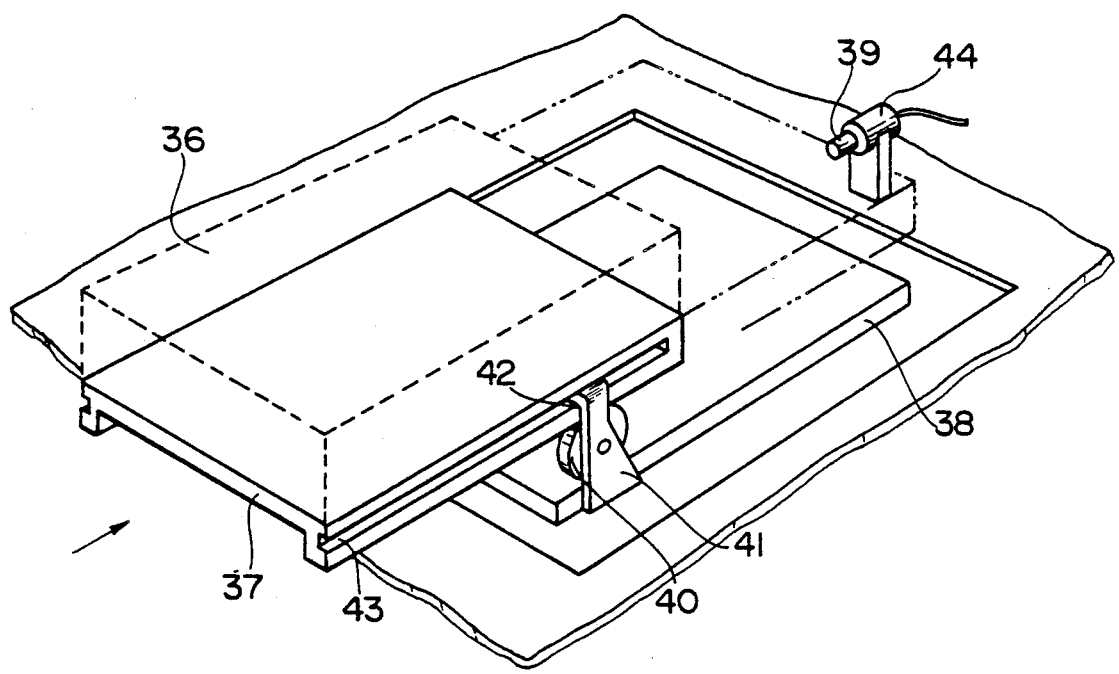
FIG. 6 illustrates an alternative embodiment of the safety device, in which the apparatus is in its operative or functioning position.
Figure 7:
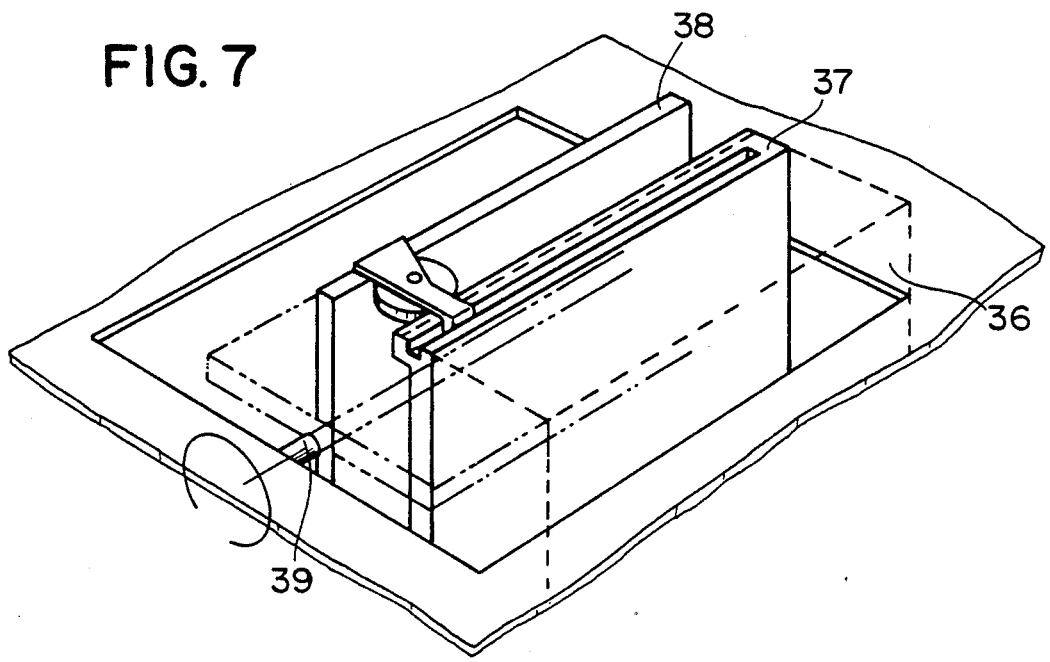
FIG. 7 illustrates the device of FIG. 6, in which the apparatus is concealed in the safety position.

Referring now to FIGS. 6 and 7 illustrating a further embodiment of the device according to the invention, the apparatus 36 is tightly mounted on a first platform 37, slidably mounted on a second platform 38. This second platform 38 is free to turn about an axis 39 coplanar to the said platform.

The sliding of the first platform 37 with respect to the second platform 38 is achieved by means of a traction wheel 40 which rests on the said first platform 37 and which is mounted on a flange 41 with a transversal prolongation 42 for sliding on a guide slot 43, provided in the said first platform 37.

The axis 39 is rotatingly driven by means of an electromotor 44. Similarly the traction wheel 40 of the first platform 37 will be operatively assisted by means of an electromotor, not represented.

FIGS. 8 and 9 illustrate an alternative embodiment of the device of the invention, completely similar to that illustrated in FIGS. 6 and 7 with the exception that in this case the axis of rotation 39 of the second platform 38 is arranged perpendicularly to the same.

In both cases the dimensions and configuration of the case-receptacle, not represented, will permit the displacement and turn of the platforms 37 and 38.

As previously mentioned in respect of the other embodiments of the device of the invention, for the control of the device there will be provided electric switches as well as elements for inverting the turn of the electromotors which are well known to experts in the art and which have not been described since they do not form part of the invention.

I claim:

1. Safety device for concealing apparatus, particularly car radios and the like, comprising:
    a case-receptacle for containing the apparatus therein and having two adjacent intercommunicated portions, the first portion, having at least one outward opening and containing the apparatus in an operative conspicuous position, and the second portion which is concealed from the outside, housing the apparatus in a concealed position;
    guide means for guiding the apparatus in movement between the first position and the second position; and
    electromechanical drive means operatively coupled to the apparatus for driving the apparatus between the said two positions along the guide means, wherein the apparatus has a casing and the guide means comprises guide slots made in the side walls of the case-receptacle cooperating with stems provided in the apparatus casing.

2. Device according to claim 1, wherein the case-receptacle has a substantially parallelepiped configuration, the height of which is approximately twice that of the apparatus and the depth of which is somewhat deeper than that of the said apparatus housed therein.

3. Device according to claim 1, wherein the case-receptacle has a substantially parallelepiped configuration, the depth of which is at least twice that of the apparatus contained therein.

4. Device according to claim 1, wherein each of said guide slots includes a straight first section, a curved second section and a straight third section.

5. Device according to claim 4, wherein the first straight section is substantially horizontally disposed and the third straight section is substantially disposed and the third straight section is substantially vertically disposed.

6. Device according to claim 1, wherein the drive means is an electromotor, a set of speed reducing gears and a pair of connecting rods rotatably driven by said speed reducing gears, which connecting rods have slots in which the said stems of the apparatus are cooperatively engaged.

7. Device according to claim 1, wherein the guide means comprises slidable guide means.

8. Device according to claim 1, wherein the electromechanical drive means drives the apparatus rearwardly and downwardly away from the opening of the case-receptacle.

* * * * *

UNITED STATES PATENT AND TRADEMARK OFFICE
CERTIFICATE OF CORRECTION

PATENT NO. : 4,995,680

DATED : February 26, 1991

INVENTOR(S) : Alberto Gonzalez Miruri

It is certified that error appears in the above-identified patent and that said Letters Patent is hereby corrected as shown below:

Cover page, under "Inventor" change "Alberto G. Miruri" to --Alberto Gonzalez Miruri--.

Signed and Sealed this

Eighteenth Day of August, 1992

Attest:

DOUGLAS B. COMER

*Attesting Officer*   *Acting Commissioner of Patents and Trademarks*